United States Patent [19]

Fairbanks

[11] Patent Number: 5,033,802

[45] Date of Patent: Jul. 23, 1991

[54] TELEVISION ENCLOSURE

[75] Inventor: David W. Fairbanks, Monmouth Junction, N.J.

[73] Assignee: RCA Licensing Coporation, Princeton, N.J.

[21] Appl. No.: 428,697

[22] Filed: Oct. 30, 1989

[51] Int. Cl.⁵ ............................................. A47B 81/06
[52] U.S. Cl. ................................... 312/7.2; 358/254
[58] Field of Search .................. 312/7.2, 257.1, 263, 312/265.5, 265.6; 358/245, 254

[56] References Cited

U.S. PATENT DOCUMENTS

| | | | |
|---|---|---|---|
| 2,789,158 | 4/1957 | Livingston | 358/254 |
| 2,896,200 | 7/1959 | Aeschliman | 312/7.2 |
| 2,917,735 | 12/1959 | Travis et al. | 358/254 |
| 3,005,049 | 10/1961 | Yoder | 358/254 |
| 3,086,078 | 4/1963 | Sharma | 312/7.2 |
| 3,139,485 | 6/1964 | Gray et al. | 358/254 |
| 3,240,876 | 3/1966 | Whitney | 358/254 |
| 4,360,838 | 11/1982 | Babicz et al. | 358/254 |
| 4,602,826 | 7/1986 | Zimmer | 312/7.2 |
| 4,853,790 | 8/1989 | Dickie | 358/245 |

FOREIGN PATENT DOCUMENTS

| | | | |
|---|---|---|---|
| 2510342 | 1/1983 | France | 358/254 |
| 712245 | 8/1966 | Italy | 312/7.2 |

Primary Examiner—Kenneth J. Dorner
Assistant Examiner—Brian K. Green
Attorney, Agent, or Firm—J. S. Tripoli; D. H. Irlbeck; L. L. Hallacher

[57] ABSTRACT

An enclosure for a television receiver is composed of a base member, a cover member and a bezel member which are joined into a stiff triangular enclosure which supports the receiver tube and protects the tube from implosion because of impacts.

2 Claims, 4 Drawing Sheets

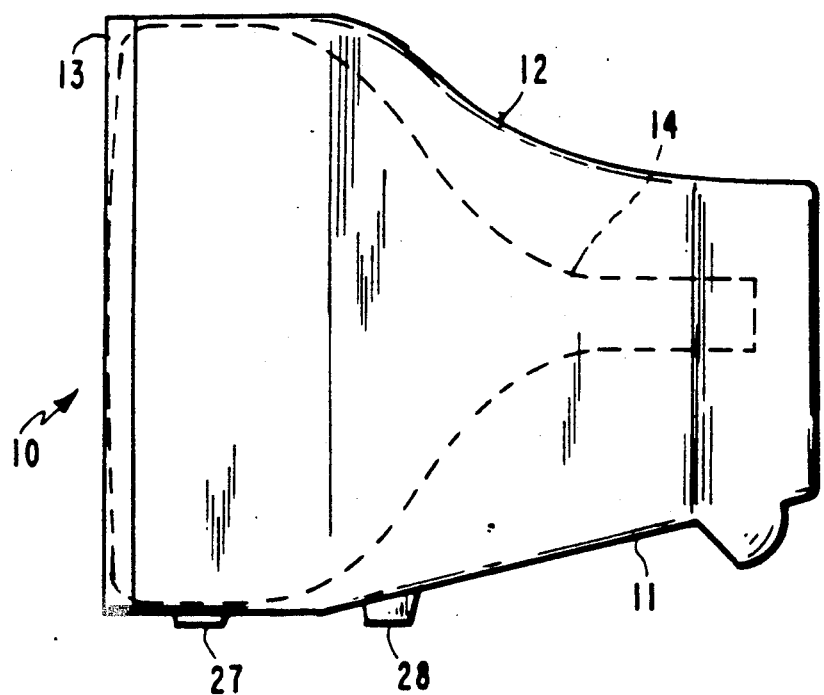
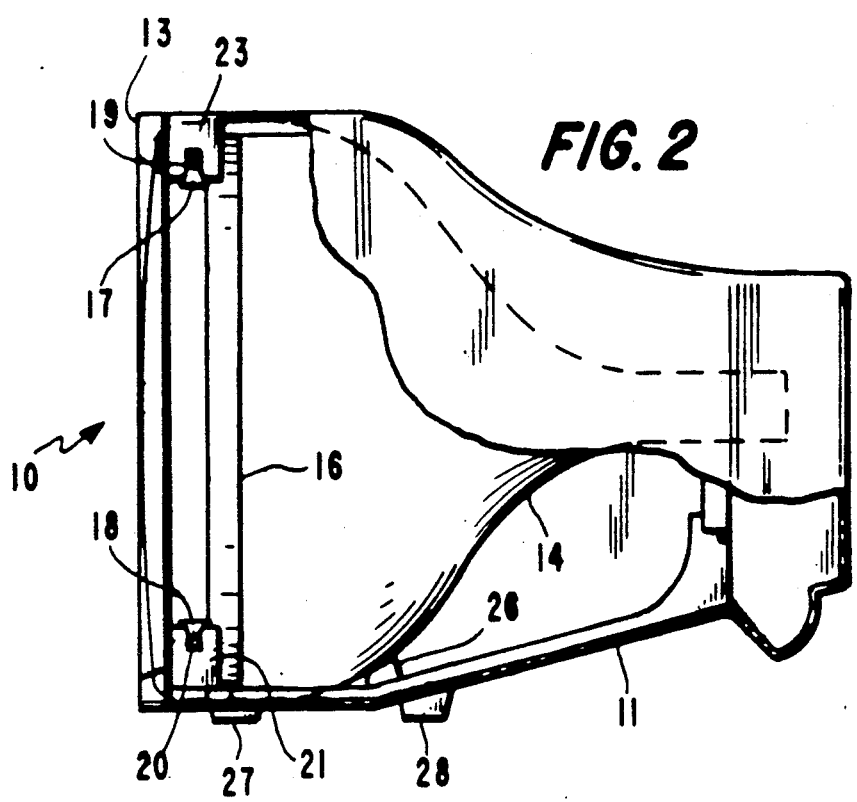

TELEVISION ENCLOSURE

BACKGROUND

This invention relates generally to television enclosures and particularly to an enclosure which is easy to manufacture, easy to assemble using automatic equipment and which maximizes impact protection to the tube.

An optimum television enclosure is low in manufacturing and assembly cost, is easily assembled, preferably using automatic equipment, and gives the picture tube substantial protection against implosion due to impact caused by dropping or being struck by other objects. The inventive television enclosure meets all of these criteria.

SUMMARY

The disclosed enclosure includes a base member which serves as a permanent support for the picture tube and which also provides space and means for mounting the electronics and speakers of the finished television receiver. A cover member cooperates with the base member to support the tube in a manner such that the only contact between the tube and the enclosure occurs with the mounting lugs which support the tube in the enclosure. A bezel member includes bezel locking means which mate with bezel locking means on the base member and the cover member to join the three elements into a single unitary enclosure. The unique construction of the base member, cover member and bezel member permit the three pieces to be joined together in a unitary picture tube enclosure which maximizes protection to the picture tube while utilizing a minimum of fasteners, for example, two screws.

BRIEF DESCRIPTION OF THE DRAWINGS

FIG. 1 is a side view of a preferred embodiment.

FIG. 2 is a side view, partially broken away, showing the mounting of the tube in the enclosure and the alignment of the enclosure pieces.

DETAILED DESCRIPTION

Figure 3:
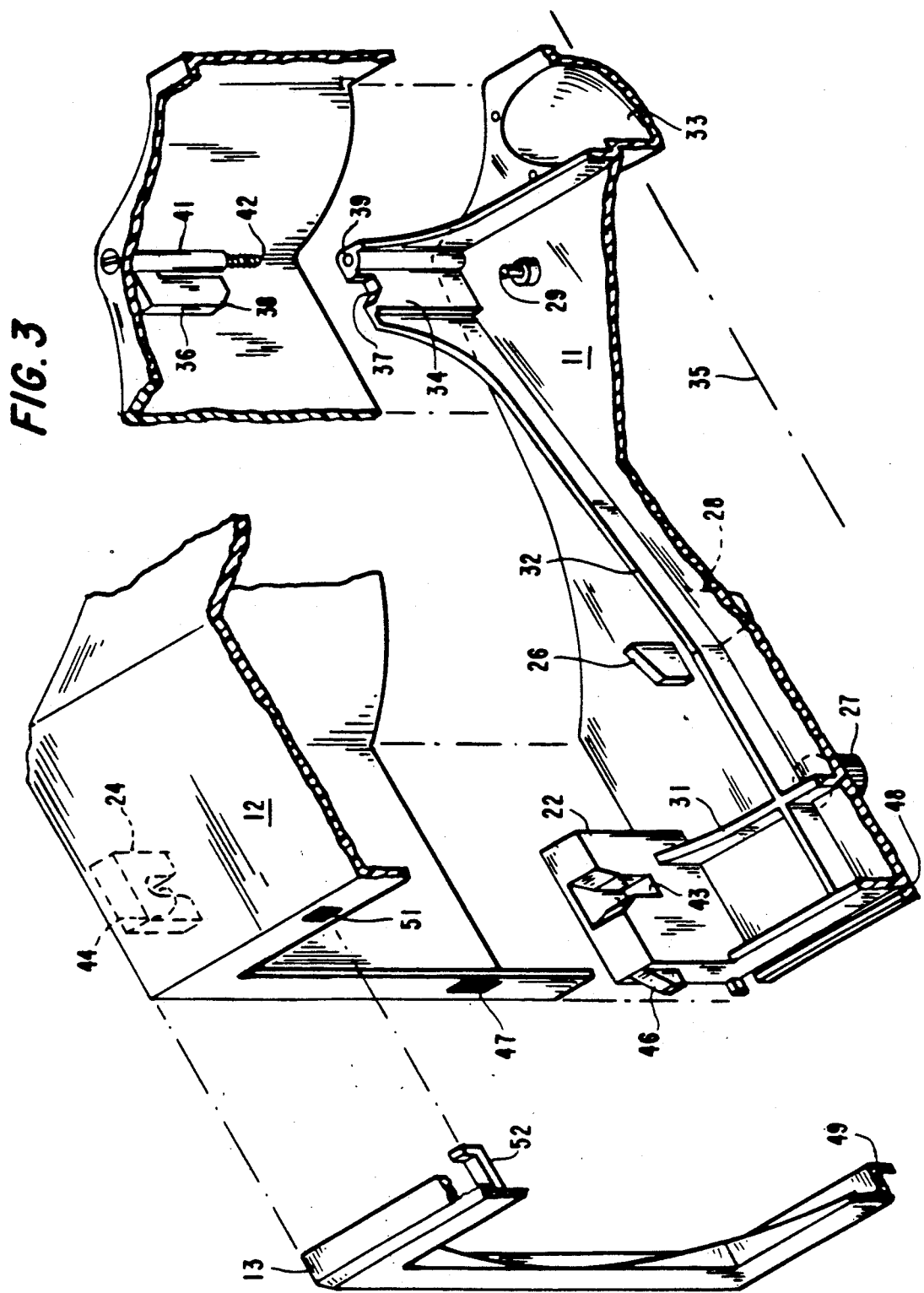
FIG. 3 is an exploded view, partially broken away, of the preferred embodiment.

In FIG. 1, the inventive television enclosure 10 includes a base member 11, a cover member 12 and a bezel member 13. A tube 14, shown in phantom, is supported in the enclosure 10 in a manner fully described hereinafter. As will become evident from the following description, the base member 11, cover member 12 and bezel member 13 each include attachment means which join the three members into a unitary enclosure which is held together by a minimum number of separate fastening means and which thus lends itself to automatic assembly.

In FIG. 2, the tube 14 is equipped with a tension band 16 which provides implosion protection to the tube. The tension band 16 is also used to affix upper mounting lugs 17 and lower mounting lugs 18 to the tube, in a manner known in the television art. The mounting lugs 17 and 18, respectively include mounting pins 19 and 20, which are used to permanently mount the tube 14 in the enclosure 10. The base member 11 includes lower permanent support means 21 and 22 (FIGS. 3 and 5) which receive the lower mounting pins 20 to support the tube 14 on the base member 11. Similarly, the cover member 12 includes upper permanent support members 23 and 24 (FIGS. 3 and 5) which receive the upper mounting pins 19 to support the tube inside the enclosure 10. In FIG. 2, the base member 11 includes an internal temporary support means 26, which is used to temporarily support the tube 14 on the base member 11 during the assembly of the enclosure about the tube 14. The temporary support 26 positions the tube in the approximate final position to assist in aligning the parts during assembly. The base member 11 also includes external feet 27 and 28, which are used to maintain the enclosure 10 in a horizontal position for viewing.

In FIG. 3, the base member 11 includes internal circuit mounting members 29. The mounting members 29 are used to support the printed circuits, or integrated electronic chips, of which the receiver control electronics are composed. The number of circuit mounting members 29 therefore is consistent with the number needed for adequate circuit support and the positions of the supports are dictated by the physical circuit configurations. The base member 11 also includes internal stiffening ribs 31 and 32. The ribs 31 and 32 give rigidity to the enclosure 10 to minimize the deformation of the enclosure caused by dropping or impact with another object. A speaker cavity 33 is included in the base member 11. The speaker for the television receiver is mounted in the cavity 33 such that the speaker faces upwardly into the cone formed by the enclosure 10. Sound emanating from the speaker flows around sides of the tube 14 and exits from the enclosure 10 through openings (not shown) provided in the bezel 10 or cover 12. The feet 27 and 28 are mounted in alignment with the stiffening ribs 31 and 32 respectively to minimize deformation of the enclosure due to the weight of the receiver.

Base member 11 includes cover alignment means 34 arranged on opposite sides of the longitudinal axis 35 of the enclosure 10. Similarly, the cover member 14 includes base alignment means 36, which also are spaced on opposite sides of longitudinal axis 35. The cover alignment means 34 includes slots 37 and the base alignment means 36 includes cam like surfaces 38. The slots 37 and cam members 38 are complementary in configuration to mate and pull the base member 11 and cover member 12 into alignment. The base member 11 includes means for receiving fasteners 39. The cover member 14 also includes means for receiving fasteners 41. In the preferred embodiment illustrated, the means for receiving fasteners 39 and 41 receive screws 42 which hold the cover member 12 on the base member 11. The complementary configuration of surfaces 37 and 38 cause the fastening members 39 and 41 to come into alignment so that the screws 42 can be inserted and serve as the only separate fastening means which hold the enclosure 10 together.

The permanent supports 22 and 24, respectively, include slots 43 and 44 for receiving the mounting pins 18 and 19 and permanently supporting the tube 14 in the enclosure 10. The permanent supports 21 and 23 (FIG. 5) are similarly constructed to receive the other mounting pins 18 and 19 affixed to the other side of the tube 14.

The base member 11 also includes cover attachment means 46, which for the embodiment illustrated are in the forms of tabs 46. The cover member 14 includes attachment means 47, which for the embodiment illustrated constitute slots 47 for receiving the tabs 46. The number of tabs 46 and slots 47 used to attach the cover member 14 onto the base member 11 is consistent with the number needed to firmly attach the cover member 47 to the base member 46. The base member 11 also includes bezel attachment means 48, which in the preferred embodiment shown is a slot extending substantially the full width of the enclosure 10. A bezel 13 includes a lip 49, which is received by the slot 48. The cover member 14 includes bezel locking means 51, which in the preferred embodiment shown is a slot. Also, the bezel member 13 includes resilient bezel locking means 52, which in the preferred embodiment shown is a flexible L shaped member which snaps into the slot 51.

In assembly, the tube 14 is placed onto the base member 11 with the mounting pins 18 and 19 resting in the slots 43 of the lower permanent support members 21 and 22. The tube 14 is held in the approximate permanent position by the temporary support means 26. The cover member 14 is placed on the tube so that the other mounting lugs 19 enter the slots 44 of the upper permanent support means 24 of the cover member 14. Additionally, the slots 47 engage the tabs 46 to attach the cover member 14 to the base member 11. The base alignment members 36 and the cover alignment members 34 engage one another and the complimentary configuration of edges 37 and 38 cams the base member 11 and cover member 14 into alignment so that the screw receiving means 39 and 41 are in alignment to receive the permanent holding screws 42. When the enclosure 10 is thus fully assembled the sole support of the tube within the enclosure 10 are the mounting pins 18 and 19 which engage the permanent holding members 22 and 24. The lip 49 on the bezel member 13 is inserted into the slot 48 of the base member 11. The L-shaped resilient members 42 engage the slots 51 to permanently hold the bezel on the base member 11 and cover 14. When finally assembled the base member 11, cover member 14 and bezel member 13 form a stiff support which protects the tube 14 from damage in the event that the television receiver is dropped or otherwise impacts with another object.

Figure 4:
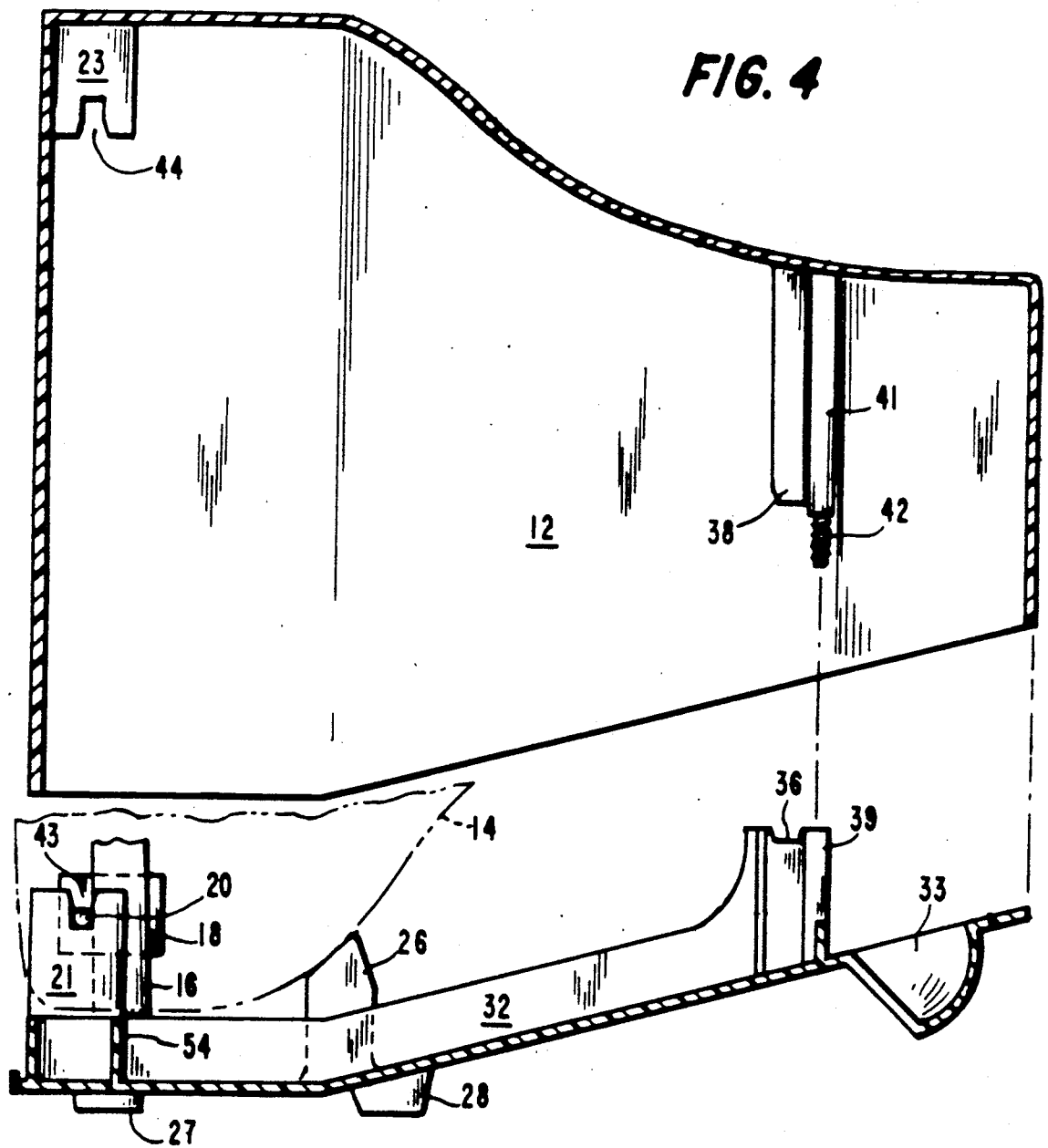
FIG. 4 is a cross section, partially broken away, of the preferred embodiment.

FIG. 4 is a cross section, partially broken away, showing the alignment of the various parts during the assembly stage. The tension band 16 permanently affixes of the mounting lugs 17 and 18, and their associated mounting pins 19 and 20 on the tube 14. The mounting pins (FIG. 4) engage the slots 43 and the tube 14 initially rests against the temporary support 26. When the cover member 12 is placed over the tube 14 the slots 44 engage the other mounting pins 19 to raise the tube 14 off the support 26 as the complementary surfaces 36 and 38 align the base member 11 and the cover member 12. The cover member 12 is slightly larger than the base member 11 and thus loosely fits down over the base member to avoid contact between the two members along the seam which the edges of the members form around the enclosure. This greatly reduces the possibility of the base and cover members vibrating and generating a noise.

Figure 5:
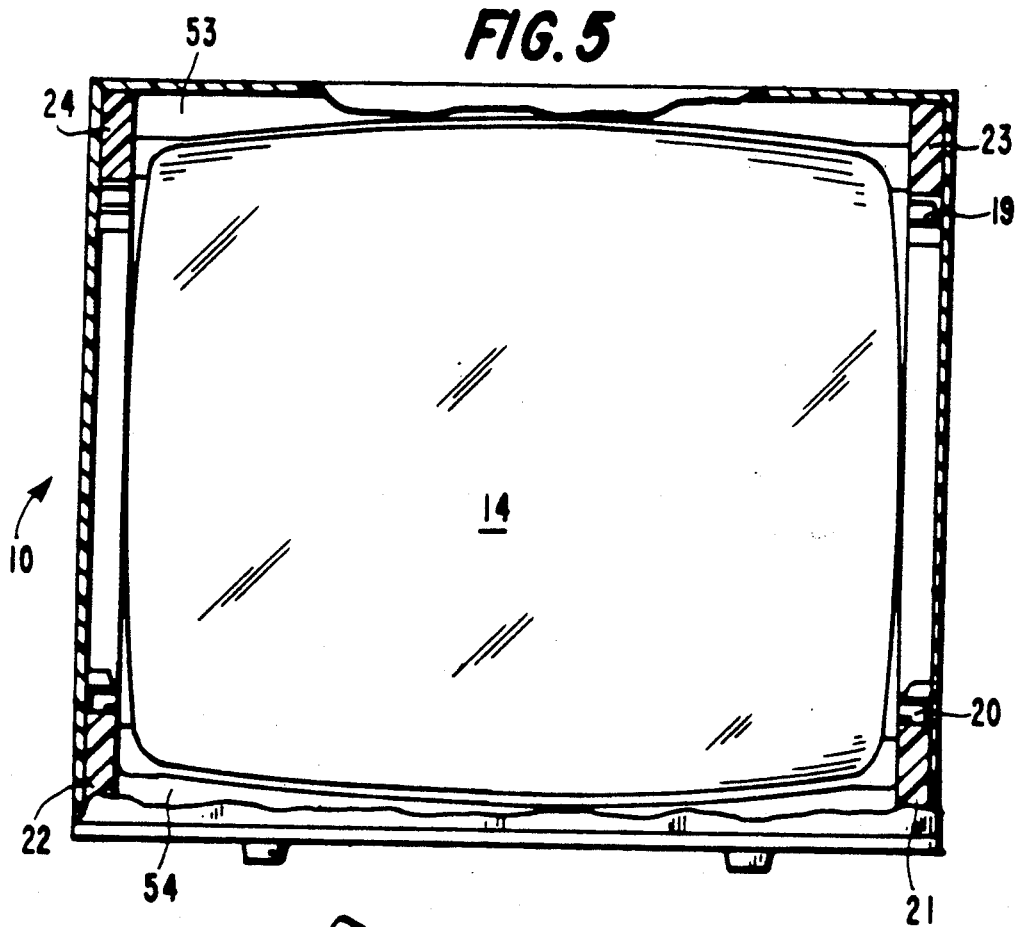
FIG. 5 is a front view, partially in cross section, of the preferred embodiment.

FIG. 5 is a front view more fully showing how the support of the tube 14 in the enclosure 10 by the pins 19 and 20. Upper and lower horizontal ribs 53 and 54 respectively extend the full width of the enclosure 10. As shown in FIG. 4, ribs 53 and 54 are centered on the tension band 16 and when the enclosure 13 is fully assembled the ribs are spaced a small distance from the tube 14. During impact the supports 22 and 24 flex and the ribs 53 and 54 absorb the shock and support the heavy drop loading. The on/off switch, tuner, channel indicator, volume control and other electronic controls can be placed in any desired location around the face of the bezel 13.

Figure 6:
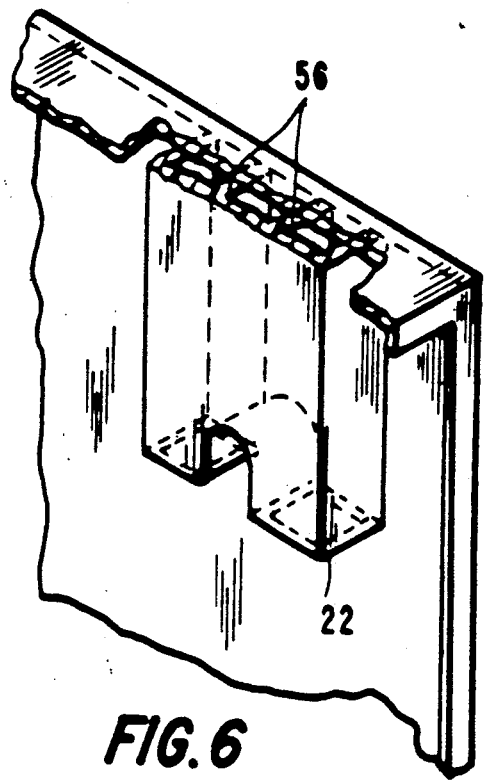
FIG. 6 shows the construction of the mounting members which support the tube in the enclosure.

In FIG. 6 the construction of the permanent support members 22 and 24 is shown in more detail. The permanent supports 22 and 24 are hollow but contain several vertical ribs 56. The vertical ribs 56 add substantial strength to the mounting members 22 and 24. Advantageously, because the members are hollow they are flexible and resilient and thus are capable of absorbing substantial energy to protect the tube 14 from imploding due to impact. The mounting members 22 and 24 therefore serve as energy absorbing members and forces applied to the tube are transmitted to the walls of the enclosure 10 as compression loads.

What is claimed is:

1. A three member enclosure having a bottom, a back and three sides for a television receiver having a tube equipped with mounting pins, said enclosure comprising:
    a base member forming said bottom and including lower permanent support means for engaging a lower portion of said mounting pins and permanently supporting said tube in said enclosure, said base member also including cover alignment means, cover attachment means, bezel locking means, first means for receiving fasteners, a cavity for mounting a speaker and stiffening ribs;
    a cover member forming said back and said three sides and including second means for receiving fasteners and upper permanent support means for engaging an upper portion of said mounting pins and permanently supporting said tube in said enclosure, said lower and upper support means constituting the sole means for contact for a tube to be supported in said enclosure, base alignment means having a configuration complimentary to said cover alignment means for mating with said cover alignment means and aligning said base member and said cover member, attachment means for engaging said cover attachment means and attaching said cover member to said base member, said cover member also including bezel locking means;
    a bezel member including locking members for engaging said bezel locking means of said base member and of said cover member and for forming a stiff enclosure composed of said base member, said cover member and said bezel member around said tube;
    temporary support means for temporarily supporting said tube during assembly; and
    said base member including feet on the outside surface, said feet being offset from said temporary support means.

2. The enclosure of claim 1 wherein said means for receiving fasteners are means for receiving screws and are a maximum of two in number.

* * * * *